J. C. SMITH.
LATCH FOR VEHICLE DOORS.
APPLICATION FILED MAR. 10, 1916.

1,186,449.

Patented June 6, 1916.

Inventor
J. C. Smith
By Victor J. Evans
Attorney

Witnesses
A. C. Newkirk

UNITED STATES PATENT OFFICE.

JOHN C. SMITH, OF HULLS, ILLINOIS.

LATCH FOR VEHICLE-DOORS.

1,186,449. Specification of Letters Patent. Patented June 6, 1916.

Application filed March 10, 1916. Serial No. 83,390.

*To all whom it may concern:*

Be it known that I, JOHN C. SMITH, a citizen of the United States, residing at Hulls, in the county of Pike and State of Illinois, have invented new and useful Improvements in Latches for Vehicle-Doors, of which the following is a specification.

This invention is an improved latch for use on the door of an automobile or other vehicle, the object of the invention being to provide an improved latch of this character which operates automatically to secure the door when the latter is closed and which may be readily operated to release the door when it is desired to open the same and which is extremely cheap and simple in construction, is strong and durable and is not likely to get out of order.

The invention consists in the features of construction, combination, and arrangement of devices, hereinafter described and claimed.

Figure 1:
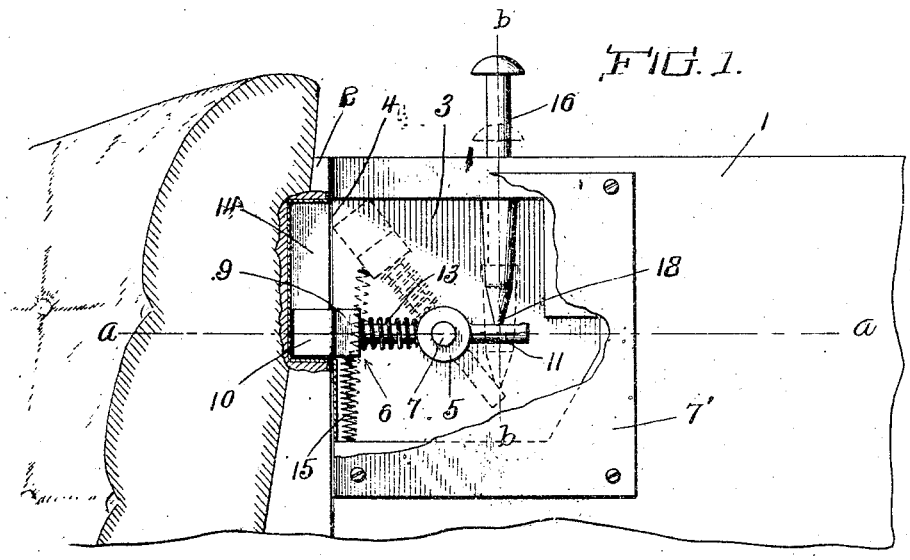
Figure 2:
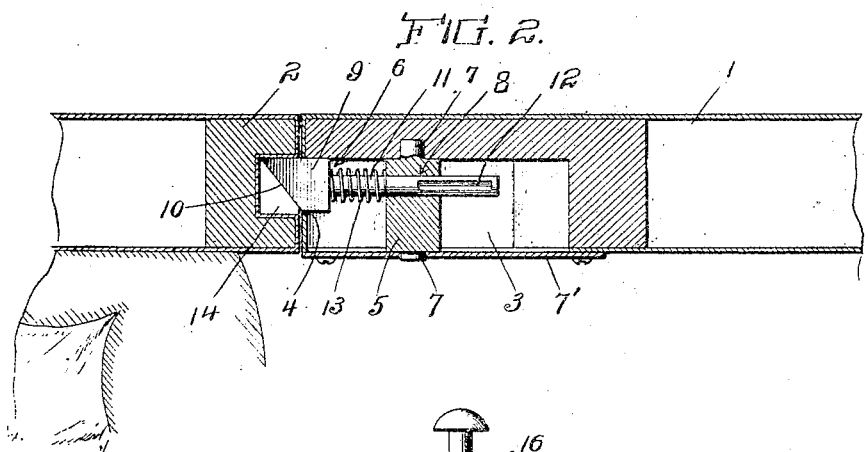
Figure 3:
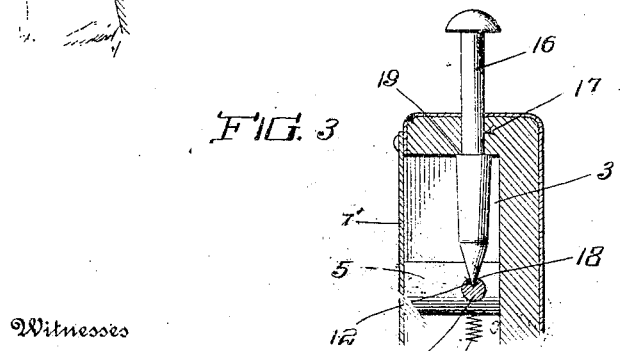

In the accompanying drawings: Figure 1 is an elevation of a vehicle door latch constructed and arranged in accordance with my invention and showing the same installed in a vehicle door, and looking from the inner side of the door, the face plate of the latch being partly removed and the latch being shown in engaged position in full lines and in door releasing position in dotted lines. Fig. 2 is a horizontal sectional view of the same on the plane indicated by the line *a—a* of Fig. 1. Fig. 3 is a detail vertical sectional view of the same on the line indicated by the line *b—b* of Fig. 1.

For the purposes of this specification, a portion of the door of an automobile or other vehicle is indicated at 1 and a portion of the side of the vehicle body against which the door closes is indicated at 2. The door is provided on its inner side with a recess 3 which opens at the free edge of the door, as at 4. A pivot element 5 is provided which carries the latch 6 and the said pivot element is here shown as an arbor having bearings 7 at its ends which are mounted in the door and in a face plate 7 which is here shown as secured to the inner side of the door to close the recess 3. The pivot element is provided with a transverse opening 8.

The latch 6 has a head 9 of the usual construction provided on the inner side with an inclined camming face 10 and an arm 11 extends from the inner side of the head and passes freely through the transverse opening in the pivoting element so that the latch is mounted in and carried by the pivoting element for longitudinal movement and also for angular movement with said pivoting element. The arm 11 projects also beyond the inner side of the pivoting element and said extending portion of the arm is provided in its upper side with a groove 12. A coiled spring 13 is placed on the arm of the latch between the pivoting element and the head and exerts its tension to normally move the head of the latch outwardly and hold the same in engagement with the keeper recess or element 14 of the wall or side against which the door closes. A spring 15 is also employed which draws downwardly on the head of the latch and normally holds the same in engaged position and bearing against the lower side of the opening 4.

I also provide a latch releasing plunger 16, which operates in a vertical guide opening 17 in the door and the lower end of which is pointed as at 18 and is slidably engaged in the groove 12 of the arm of the latch. The upper end of the plunger projects above the door and the plunger is formed with a stop enlargement or shoulder 19 which bears against the upper side of the recess 3 or casing of the latch. The plunger is normally held in raised position, and retained with its lower end engaged with the groove 12 by the action of the spring 15. When it is desired to release the door and permit the same to be opened, it is only necessary to press downwardly on the upper end of the plunger. This causes the plunger by the slidable engagement of its lower end with the groove in the arm of the latch, to turn the inner end of the latch arm downwardly, thereby turning the pivoting element and raising the latch head against the tension of the spring 15 out of the keeper or keeper recess 14. As soon as the plunger is released, the spring 15 draws the latch head downwardly and the latch being held in projected position, normally by the first-named spring, serves, when the door is again closed, to automatically latch the door by engaging the keeper 14, as will be understood. In practice, the lock will be provided with a right and left hand latch. The lock may be arranged for either a right or left hand door.

A suitable casing may be provided for the latch and its connections within the scope of my invention and to facilitate the attachment of the device to a door. Other modifications may also be made without departing from the spirit of my invention as defined by the appended claims.

Having described the invention, what is claimed is:

1. In a latch, a pivot element, a latch carried by and longitudinally movable in the pivot element, and also movable pivotally with said pivot element, said latch having an extended arm, a spring to hold the latch and pivoting element normally in initial position, a spring to project the latch, and an operating element mounted in a guide and having an end slidably engaged with the extended arm of the latch.

2. In a latch, a pivot element, a latch carried by and longitudinally movable in the pivot element, and also movable pivotally with said pivot element, said latch having an extended arm, a spring to hold the latch and pivoting element normally in initial position, a spring to project the latch, an operating element mounted in a guide and having an end slidably engaged with the extended arm of the latch, said extended arm having a groove for the reception of said end of the operating element, and said operating element having a stop to limit its outward movement.

In testimony whereof I affix my signature in presence of two witnesses.

JOHN C. SMITH.

Witnesses:
L. H. KENNADY,
E. B. OVER.